A. J. MUNDY, DEC'D.
F. B. MUNDY, EXECUTRIX.
MONITOR LUBRICATION SYSTEM FOR AUTOMOBILES.
APPLICATION FILED MAR. 12, 1912.

1,071,009.

Patented Aug. 19, 1913.

2 SHEETS—SHEET 2.

WITNESSES:
M. E. Flaherty.
A. E. O'Brien.

INVENTOR:
Arthur J. Mundy

UNITED STATES PATENT OFFICE.

ARTHUR J. MUNDY, OF MILLIS, MASSACHUSETTS; FLORA B. MUNDY, OF MILLIS, MASSACHUSETTS, EXECUTRIX OF SAID ARTHUR J. MUNDY, DECEASED.

MONITOR LUBRICATION SYSTEM FOR AUTOMOBILES.

1,071,009.   Specification of Letters Patent.   Patented Aug. 19, 1913.

Application filed March 12, 1912. Serial No. 683,266.

*To all whom it may concern:*

Be it known that I, ARTHUR J. MUNDY, of Millis, in the county of Norfolk and State of Massachusetts, a citizen of the United States, have invented a new and useful Improvement in Monitor Lubrication Systems for Automobiles, of which the following is a full, clear, and exact description, reference being had to the accompanying drawings, forming a part of this specification, in explaining its nature.

My invention relates to a system by which one may be guided and advised as to proper and systematic lubrication of an automobile.

It is a fact well recognized that the various parts of an automobile should be lubricated at certain intervals, some parts more often than others depending not only upon the amount of wear to which the part is subjected but also upon the mode of lubrication. It is also well recognized that the care of any part with respect to its lubrication depends not so much upon the time interval which may intervene between the oiling or lubrication of such part but rather upon the amount of wear to which the part or lubricant for such part has been subjected, the best guide for this being the number of miles which the machine has run, that is, after the lubrication of any part or parts.

Owing to the fact that so many different parts of the machine need lubrication and different modes of lubrication and owing also to the varying conditions which must govern the lubrication of the parts, the effect is that very few automobiles receive proper attention and this only in those rare cases where extreme care is taken.

It is accordingly the essential object of my invention to provide a system whereby one skilled or unskilled in the art may according to the indication of mileage on the odometer of the automobile tell when any part of the machine requires lubrication; tell what part of the machine requires lubrication and how to lubricate the same; and after a part has been attended to indicate at what subsequent reading of the odometer the same part will require further attention.

The system embodying my invention can best be practised by means of a card file and I have accordingly shown the system in such an embodiment and which can best be seen and understood by reference to the drawings, in which—

Figure 1:
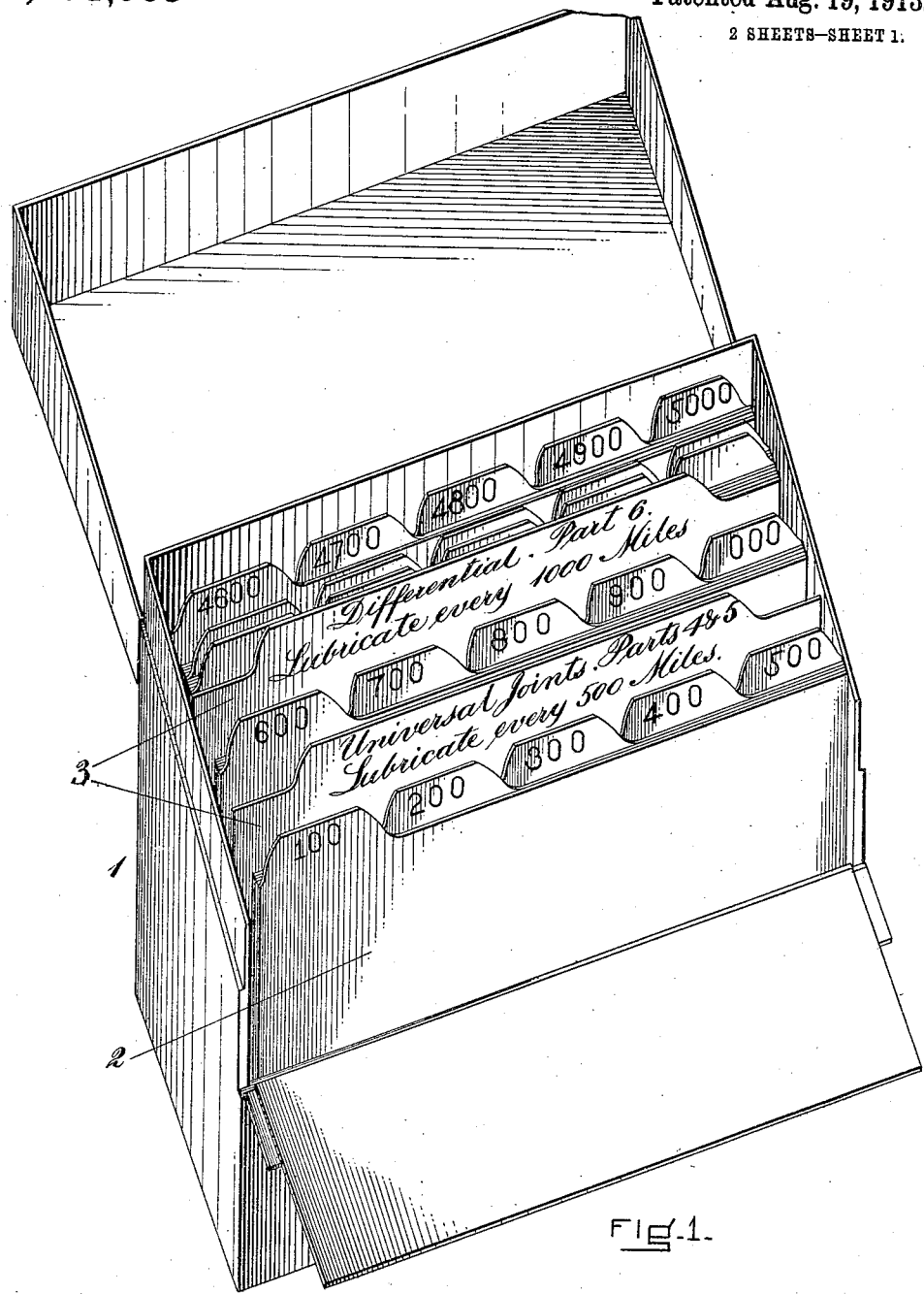
Figure 2:
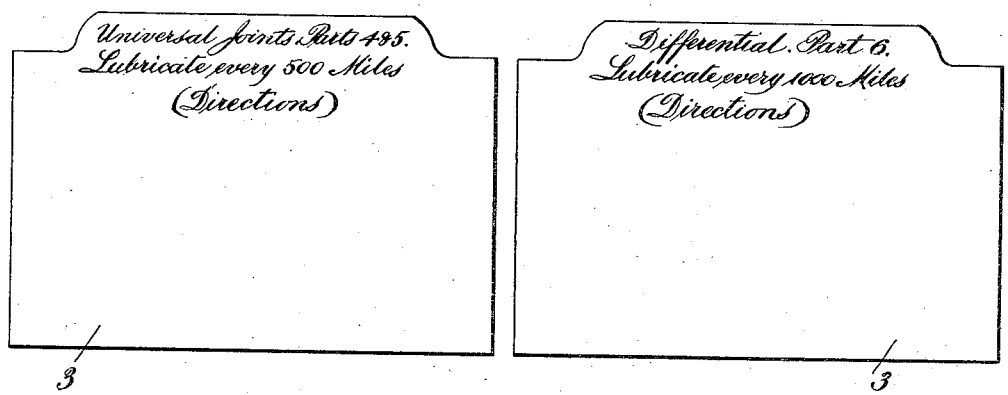
Figure 3:
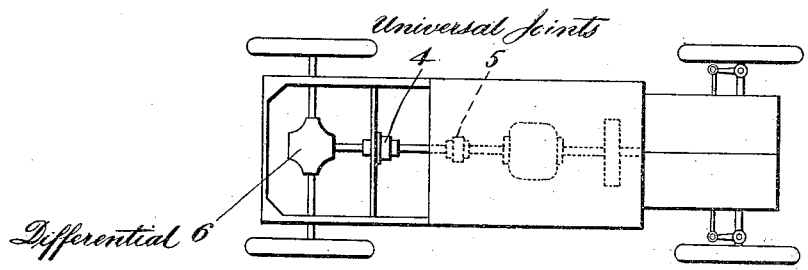
Figure 4:
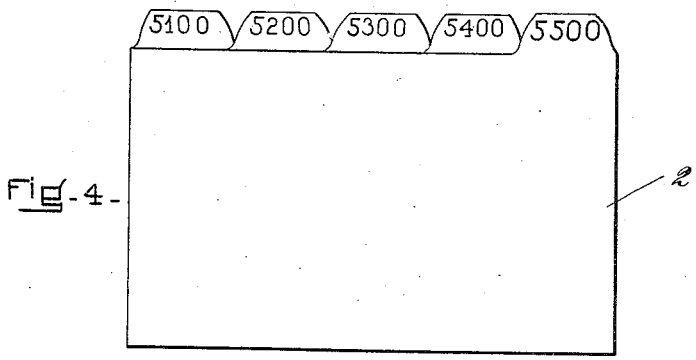

Figure 1 shows the card file in perspective with the various cards therein. Fig. 2 is a plan of some of the cards used in practising the system. Fig. 3 is a diagrammatic plan of an automobile with the parts indicated thereon for purposes of example and which are used in practising the system as will hereinafter be explained. Fig. 4 is a plan of a group of cards reversed to show the numerical readings thereon, to which special reference will hereinafter be made.

Referring to the drawings: 1 represents a casing in which are contained a series of cards 2, each card representing a unit of distance and which unit I prefer to be 100 miles as this represents the maximum distance the machine should run after the lubrication of those parts that require the most constant attention and at the termination of which distance the same parts should be again lubricated. These parts are arranged and numbered in numerical order, 100, 200, 300, etc., indicating miles, and correspond with the readings to be eventually obtained in due course of running on the odometer. I prefer that not less than 50 cards be used which accordingly represent 5000 miles of running. More cards than this may of course be used or even a less number except that a sufficient number of cards should be used as shall indicate thereon the maximum distance the machine should run after the lubrication of that part or parts requiring the least attention, as for example, assuming that a part of the machine requiring the least attention would require such attention only for every 1000 miles of the machine's running, then there should be not less than ten cards or units which would indicate thereon such 1000 miles of running.

Besides the cards 2 there is employed another series of cards 3. These cards correspond in number with the different parts of the machine with an indication thereon of such part, an indication also of how often the part should be lubricated and how to lubricate the same. Where there are separate parts which should be lubricated at the same time or after the same interval of running and in the same manner then but one of the cards 3 need be employed to indicate such parts.

I have shown in Fig. 2 examples of the cards 3. Each of the cards shown bears the name of the part or parts to which the card refers, the same being for purposes of illustration in the one case "Universal joints" referred to on one card, and "The differential" referred to on the other. Each of the cards bears also reference to the number of miles the machine may run, according to the reading of the odometer, after the lubrication of the part or parts and before the same part or parts requires to be again lubricated and which in the case of "Universal joints" may, for example, be 500 miles and in the case of "The differential" 1000 miles. The cards bear also directions (not shown) for lubricating the respective part or parts indicated on the cards.

Inasmuch as many are not familiar with the names and location of the various parts of an automobile there accompanies the cards 3 a cut of the machine to which the cards 3 refer with all the parts of the machine to be lubricated named and numerically referred to thereon with leader lines running from the names to the respective parts. This I have exemplified in a diagrammatic cut of an automobile shown in Fig. 3 where 4 and 5 represent for purposes of illustration separate universal joints and 6 the differential. Accordingly the cards 3 bearing the names of these parts and other memoranda as above referred to, will also bear respectively, the one card the numbers 4 and 5 and the other card the number 6 by which the location of these parts may be understood by reference to the cut of the automobile.

The system is carried out in the following manner: It will be assumed that the odometer is at the zero point and that all the parts of the automobile requiring lubrication have been attended to. Then the cards 3 bearing the names of those parts which require lubrication every one hundred miles of the automobile's running according to the odometer will be placed after the first one of the cards 2 of the file or the one marked "100." Those parts requiring lubrication every two hundred miles of the machine's running will be placed after the card of the cards 2 marked "200," and so on, in which the card indicating the universal joints, which parts require lubrication every five hundred miles according to the basis above assumed, will be placed after the card of the cards 2 marked "500," and the card indicating the differential which requires lubrication every one thousand miles according to the assumed basis will be placed after the card of the cards 2 marked "1000." It will now be assumed that all the cards 3 referring to every part of the automobile which requires lubrication, have been placed in their proper places and the machine has run 100 miles. When such reading occurs according to the odometer, one using the system will immediately ascertain by reference to the card or cards placed back of the first one of the cards 2 of the file or the one bearing the numeral 100, that certain parts of the automobile need lubrication and he will attend to such lubrication, then removing the card or cards 3 and placing the same back of the second card of the cards 2 of the file or the one bearing the numeral 200, which indicates that when the machine has run 200 miles according to the reading of the odometer these same parts will require further lubrication. The same rule applies in relation to all of the other parts. For example according to the basis assumed herein, the card referring to the universal joints will present itself after the machine has run 500 miles and after the joints have been attended to this card of the cards 3 is removed and placed back of the card of the cards 2 bearing the numeral 1000, the position of the card thus indicating that at the end of 1000 miles of the machine's running the universal joints will require further attention.

As I have already explained, I prefer that a sufficient number of cards be used to represent 5000 miles of the machine's running in which case the cards may be removed from the beginning of the file as the running progresses and placed in numerical order of progression at the back, building up a series indicating another 5000 miles of running. I prefer, however, as shown, that the cards 2 of the file may be numbered to indicate 10,000 miles of the machine's running which may readily be accomplished by numbering the backs of the cards so as to provide a series of cards 2 numbered from 5000 to 10,000, the cards simply being reversed in extending the series. In order to avoid the necessity of removing and reversing each card as such card of the primary series is passed I have provided as shown in Fig. 4 that a group of five cards may be removed and reversed at one time for extending the series. In other words, according to the numerical numbering above assumed the first of the cards 2 bearing the number 100 on its face will bear the number 5500 on its back; the second of the cards 2 will bear 200 on its face and 5400 on its back, and so on down to the fifth of the cards 2 which will bear on its face the number 500 and on its back the number 5100 so that when these cards are reversed as a group the cards will read in numerical order 5100 to 5500, inclusive (see Fig. 4). The other cards 2 are numbered in groups of five in the same manner. Of course none of the cards 2 are removed and reversed in the file until those cards have been passed in the running of the machine and the cards 3 removed and advanced to their proper places.

It is apparent of course that the present system may be applied to caring for an automobile in other ways than what may be termed lubrication, and I wish to include by this term any care which the automobile may require and to which the system may be applicable.

Having thus fully described my invention, I claim and desire to secure by Letters Patent of the United States:—

1. A monitor system of the character specified which consists of a series of primary numerical indices progressively arranged to represent mileage of an automobile, the respective indices corresponding numerically with those distances of the machine's running at which different parts thereof will require lubrication, and associated therewith a series of secondary indices indicating different parts of the automobile requiring lubrication, the said secondary indices being intimately associated with said primary indices in a manner whereby each of said secondary indices will be associated with that primary numerical index which indicates in terms of miles of the machine's running when such part will require lubrication.

2. A monitor system of the character specified which consists of a series of primary numerical indices progressively arranged to represent mileage of an automobile, the respective indices corresponding numerically with those distances of the machine's running at which different parts thereof will require lubrication, and associated therewith a series of secondary indices indicating different parts of the automobile requiring lubrication, the said secondary indices being intimately associated with said primary indices in a manner whereby each of said secondary indices will be associated with that primary numerical index which indicates in terms of miles of the machine's running when such part will require lubrication, said indices having also such adaptation that at the times when the mileage of the machine tallies with the numbers on successive ones of the primary series of indices then after the parts of the machine indicated by the secondary indices have been attended to, the secondary indices may be advanced to positions where they will be associated with other primary indices indicating when, according to the mileage of the machine, the same parts thereof will require to be again lubricated.

3. A monitor system of the character specified which comprises a primary series of cards and a secondary series of cards, the primary series of cards being numbered progressively with numbers thereon indicating mileage of an automobile, the respective numbers corresponding with those periodical distances of the machine's running at which different parts thereof will require lubrication, the secondary series of cards having thereon the names of different parts of the machine to be lubricated with an indication of how often such parts should be lubricated expressed in the running miles of the machine, the secondary series of cards being associated with the primary series in a manner whereby each of said secondary cards will be associated with a primary card having thereon a number which indicates in terms of miles of the machine's running when the part referred to on the secondary card requires lubrication.

4. A monitor system of the character specified which comprises a primary series of cards and a secondary series of cards, the primary series of cards being numbered progressively with numbers thereon indicating mileage of an automobile, the respective numbers corresponding with those periodical distances of the machine's running at which different parts thereof will require lubrication, the secondary series of cards having thereon the names of different parts of the machine to be lubricated with an indication of how often such parts should be lubricated expressed in the running miles of the machine, the secondary series of cards being associated with the primary series in a manner whereby each of said secondary cards will be associated with a primary card having thereon a number which indicates in terms of miles of the machine's running when the part referred to on the secondary card requires lubrication, said cards having also such adaptation that at the times when the mileage of the machine tallies with the numbers on successive ones of the primary series of cards then after the parts of the machine referred to on the secondary cards have been attended to, the secondary cards may be advanced to positions where they will be associated with other primary cards having numbers thereon indicating when, according to the mileage of the machine, the same parts will require to be again lubricated.

5. A series of cards having on the faces thereof numbers in numerical progression, said cards having on the backs thereof other numbers in continued numerical progression of the numbers on the faces of said cards, and which numbers on the backs of said cards are adapted to continue in proper numerical progression with the numbers on the faces thereof by successively reversing portions of said cards.

6. A series of cards having on the faces thereof numbers in numerical progression, said cards having on the backs thereof other numbers in continued numerical progression of the numbers on the faces of said cards, and which numbers on the backs of said cards are arranged in a reverse order of numerical progression whereby they may continue in proper numerical progression with the numbers on the faces thereof by successively reversing portions of said cards.

ARTHUR J. MUNDY.

Witnesses:
JOHN E. R. HAYES,
M. E. FLAHERTY.

Copies of this patent may be obtained for five cents each, by addressing the "Commissioner of Patents, Washington, D. C."